(12) United States Patent
Young et al.

(10) Patent No.: US 10,897,726 B2
(45) Date of Patent: *Jan. 19, 2021

(54) MULTIPLE-SLICE APPLICATION DELIVERY BASED ON NETWORK SLICE ASSOCIATIONS

(71) Applicant: Verizon Patent and Licensing Inc., Arlington, VA (US)

(72) Inventors: Kristen Sydney Young, Morris Plains, NJ (US); Kalyani Bogineni, Hillsborough, NJ (US); Jignesh S. Panchal, Hillsborough, NJ (US); Ratul Kumar Guha, Warwick, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,496

(22) Filed: May 12, 2020

(65) Prior Publication Data
US 2020/0296631 A1 Sep. 17, 2020

Related U.S. Application Data

(63) Continuation of application No. 16/351,853, filed on Mar. 13, 2019, now Pat. No. 10,667,179.

(51) Int. Cl.
| | | |
|---|---|---|
| *G06F 15/173* | (2006.01) | |
| *H04W 28/18* | (2009.01) | |
| *H04W 16/02* | (2009.01) | |
| *H04W 36/06* | (2009.01) | |
| *H04W 28/26* | (2009.01) | |
| *H04W 28/24* | (2009.01) | |

(52) U.S. Cl.
CPC .......... *H04W 28/18* (2013.01); *H04W 16/02* (2013.01); *H04W 28/24* (2013.01); *H04W 28/26* (2013.01); *H04W 36/06* (2013.01)

(58) Field of Classification Search
CPC ..... H04W 28/18; H04W 28/24; H04W 28/26; H04W 16/02; H04W 36/06
See application file for complete search history.

(56) References Cited

U.S. PATENT DOCUMENTS

2019/0082326 A1 3/2019 Mathison et al.
2019/0141606 A1* 5/2019 Qiao ................... H04W 48/04
(Continued)

*Primary Examiner* — Jonathan A Bui

(57) ABSTRACT

A device can receive, from first user equipment, information that relates to a first application, where the information includes a plurality of S-NSSAI. The device can determine whether the plurality of S-NSSAI are configured as a group of associated S-NSSAI. The device can determine that a preference is to be given to one of: communication sessions associated with the first application relative to a communication session associated with a second application, that does not utilize multiple network slices, of the first user equipment or second user equipment; traffic flows associated with the first application relative to a traffic flow associated with the second application; or a plurality of network slices associated with the first application relative to a network slice associated with the second application. The device can perform one or more actions based on determining the preference to thereby facilitate a particular functionality of the first application.

20 Claims, 7 Drawing Sheets

(56) References Cited

U.S. PATENT DOCUMENTS

| | | |
|---|---|---|
| 2019/0335366 A1 | 10/2019 | Jin et al. |
| 2019/0357122 A1 | 11/2019 | Li et al. |
| 2019/0357129 A1 | 11/2019 | Park et al. |
| 2019/0364495 A1 | 11/2019 | Mildh et al. |
| 2019/0364541 A1 | 11/2019 | Ryu |
| 2020/0015102 A1 | 1/2020 | Sun et al. |
| 2020/0022061 A1 | 1/2020 | Jin et al. |
| 2020/0029242 A1 | 1/2020 | Andrews et al. |
| 2020/0037386 A1 | 1/2020 | Park et al. |
| 2020/0178167 A1* | 6/2020 | Jia .................... H04W 48/16 |
| 2020/0252862 A1* | 8/2020 | Kim .................. H04W 48/18 |
| 2020/0260525 A1* | 8/2020 | Gan ................... H04W 12/06 |
| 2020/0267554 A1* | 8/2020 | Faccin ............... H04W 12/06 |
| 2020/0267785 A1* | 8/2020 | Talebi Fard ........ H04W 40/248 |
| 2020/0275302 A1* | 8/2020 | Youn ................. H04W 28/24 |

* cited by examiner

US 10,897,726 B2

MULTIPLE-SLICE APPLICATION DELIVERY BASED ON NETWORK SLICE ASSOCIATIONS

RELATED APPLICATION

This application is a continuation of U.S. patent application Ser. No. 16/351,853, filed Mar. 13, 2019 (now U.S. Pat. No. 10,667,179), which is incorporated herein by reference.

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

Figure 1A:
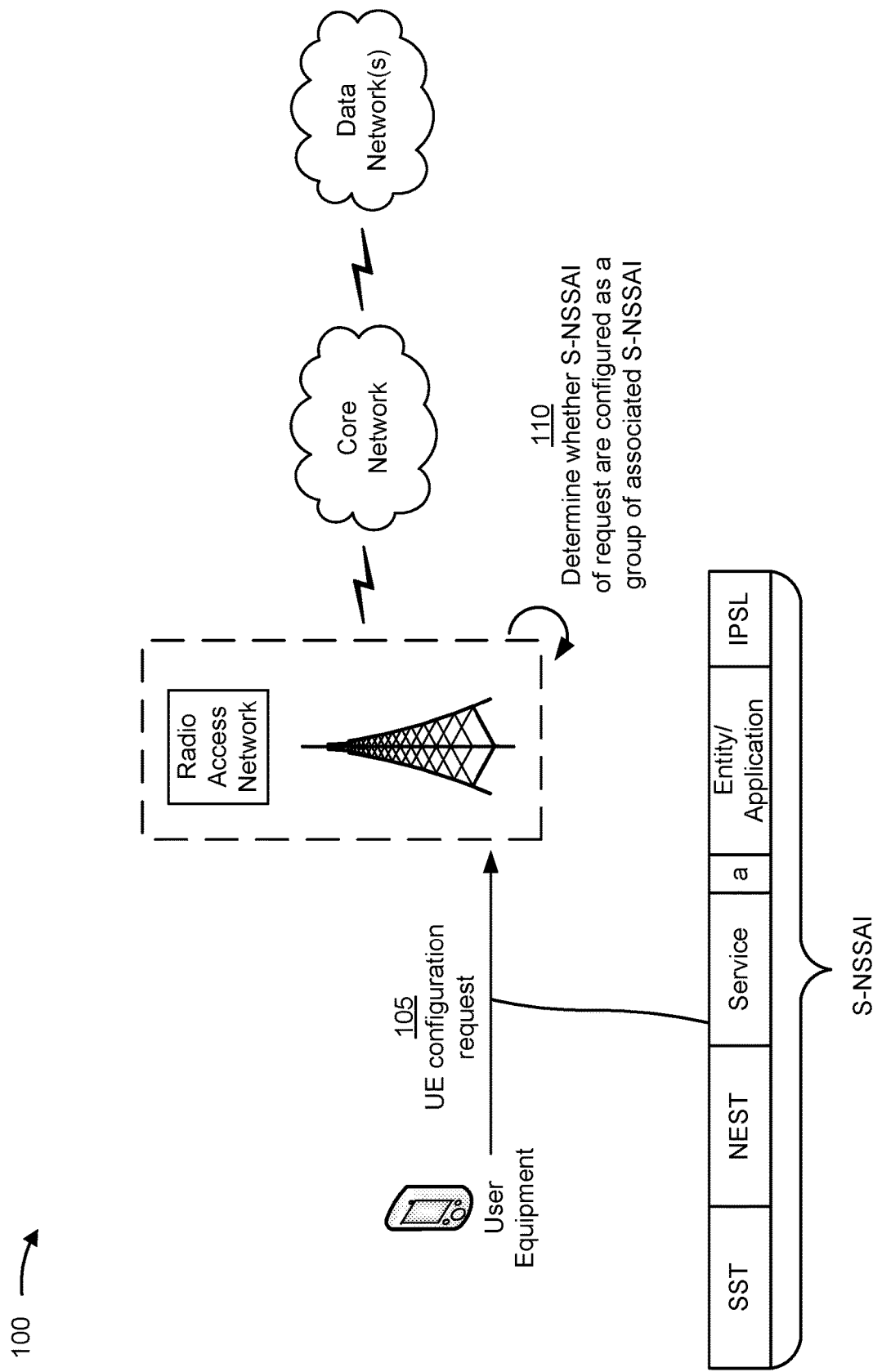
FIGS. 1A and 1B are diagrams of one or more example implementations described herein.

The following detailed description of example implementations refers to the accompanying drawings. The same reference numbers in different drawings can identify the same or similar elements.

In a wireless telecommunications system (which can be referred to herein as "the system"), such as a 5G wireless telecommunications network, network slicing allows for multiple virtual networks to run on a single physical network to support multiple services, applications, and/or entities (e.g., end users, customers, such as organizations that provide a service to end users of the wireless telecommunications system, and/or the like). In some instances, when a user equipment (UE) requests a connection (e.g., protocol data unit (PDU) connectivity) to the network for an application and/or service, the UE provides the network with information associated with the UE, the application, and/or the service. Such information can include network slice selection assistance information (NSSAI), which can include a collection or list of individual, single-network slice selection assistance information (S-NSSAI) (referred to herein individually and collectively as "S-NSSAI") that identify respective network slices associated with the UE. In such cases, a network slice selection function (NSSF) of the system can determine a network slice instance (NSI) (e.g., a virtual network of network functions (NFs) and other resources to support one or more S-NSSAI) for the S-NSSAI. The NSSF can provide, to an access and mobility management function (AMF), an NSI identifier (NSI ID) associated with the NSI. Further, the AMF can identify a session management function (SMF) to provision a communication session of a network slice, using the corresponding NSI, for the UE. The UE can be served by multiple NSIs (e.g., a first communication session of the UE can be served by a first NSI and a second communication session of the UE can be served by a second NSI).

Resources can be assigned to a communication session of a network slice based on a priority associated with the communication session. When there are insufficient resources in the network to support the communication session of the network slice, the network can preempt resources of an existing communication session with a lower priority in order to admit the communication session of the network slice. Similarly, traffic flows of the communication session of the network slice can be scheduled before a traffic flow of a lower priority communication session.

Sometimes, an application of a UE can utilize multiple network slices. In such cases, respective communication sessions (e.g., PDU sessions) can be provisioned on the multiple network slices in order to provide a particular functionality of the application. However, information elements of the S-NSSAI are not defined to enable the network to determine an association of multiple network slices and an application. Accordingly, previous techniques to determine admission and/or preemption of communication sessions, scheduling of traffic flows, and/or allocation of resources lack awareness of associations between network slices and applications. Accordingly, previous techniques can result in an impairment of an application when admission and/or preemption, scheduling, and/or resource allocation is performed without regard to whether a communication session of a network slice is one of a plurality of communication sessions that are associated with an application. Moreover, previous techniques can result in a disruption to some communication sessions associated with an application without disrupting other communication sessions associated with the application. Consequentially, the communication sessions that are not disrupted can continue to consume and waste network resources despite an impairment to the application.

Some implementations described herein enable a radio access network (RAN) of a telecommunications system (e.g., a 5G wireless telecommunications network) to determine an association among a plurality of S-NSSAI (e.g., a plurality of S-NSSAI identifying a plurality of network slices utilized by an application). Furthermore, some implementations described herein enable the RAN to determine, based on the association of the plurality of S-NSSAI, that a preference is to be given to an application associated with the plurality of S-NSSAI (e.g., a preference for communication sessions associated with the application, a preference for traffic flows associated with the application, etc.) and/or that a preference is to be given to a plurality of network slices identified by the plurality of S-NSSAI (e.g., a preference to allocate resources to the plurality of network slices).

In this way, the RAN can perform communication session admission and/or preemption, traffic flow scheduling, and/or resource allocation with regard to groups of associated network slices. For example, the RAN can perform communication session admission and/or preemption, traffic flow scheduling, and/or resource allocation so as to avoid disruption to a communication session of a network slice that is one of a plurality of communication sessions that are associated with an application. Accordingly, impairment to applications that utilize multiple network slices can be reduced and network resources, otherwise wasted when a communication session continues to serve an application that is impaired, can be conserved.

Figure 1B:
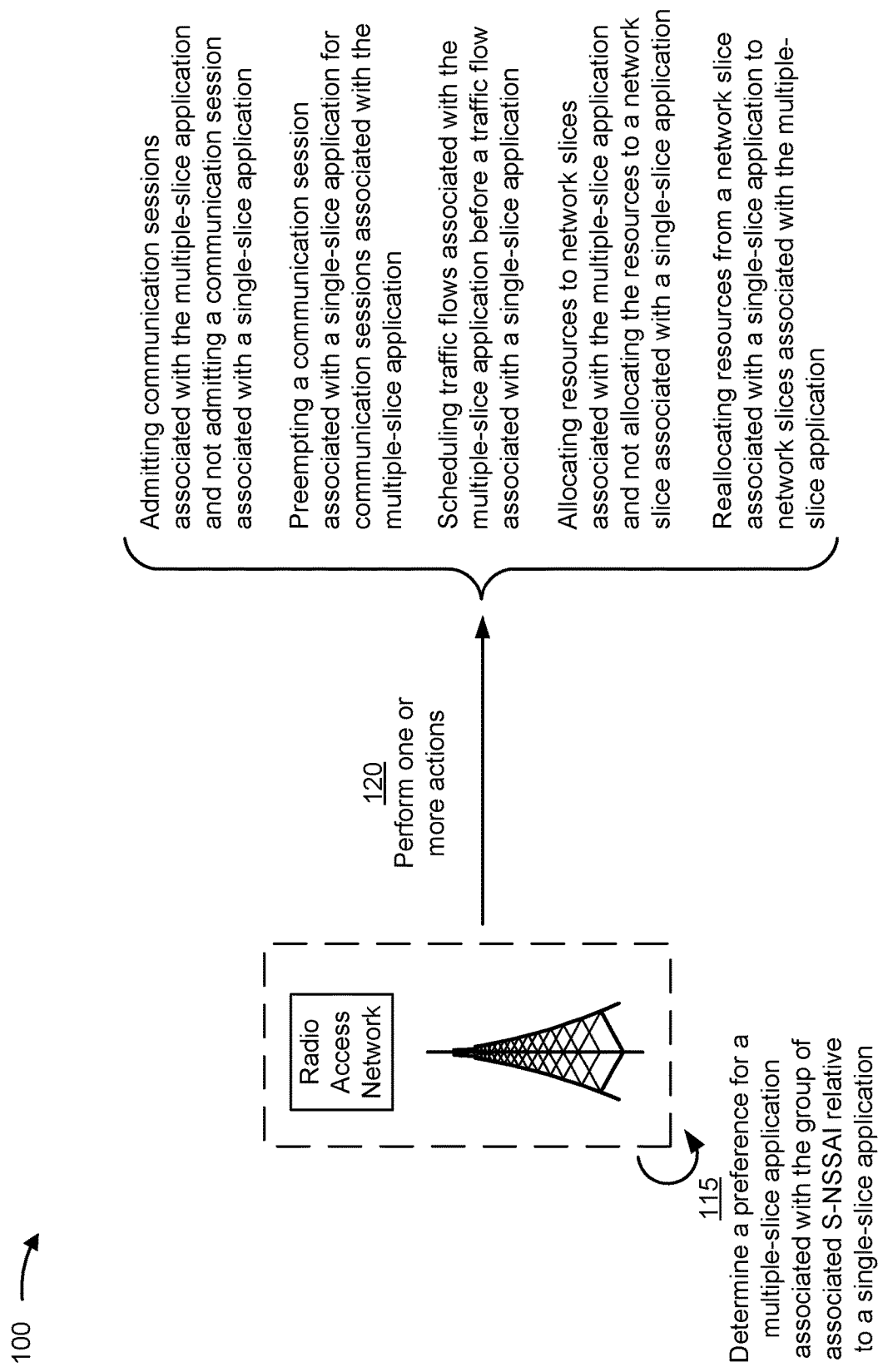

FIGS. 1A and 1B are diagrams of one or more example implementations 100 described herein. Example implementation(s) 100 illustrates various portions of a wireless telecommunications system (referred to herein as a "wireless network"), which in some implementations can be a 5G wireless telecommunications system. Example implementation(s) 100 can be a 5G wireless telecommunications system, a 4G wireless telecommunications system, a long-term evolution (LTE) wireless telecommunications system, an LTE-Advanced (LTE-A) wireless telecommunications system, and/or the like.

As shown in FIGS. 1A and 1B, example implementation(s) 100 can include a UE wirelessly connected to a RAN at a base station. The base station can be connected to a data network via a core network. The UE can run an application that involves communicating with the data network, and therefore the UE can enter into a communication session (e.g., a PDU session) with the data network via the RAN and core network. The UE and the core network can communicate application-specific data during the communication session. In some implementations, to permit the UE to enter into the communication session with the data network, the UE can send an initial request to register with the core network.

The UE can be a communication and/or computing device, such as a mobile phone, a smartphone, a laptop computer, a tablet computer, an Internet of Things device, and/or the like. The base station of example implementation(s) 100 can include an access point of a RAN, such as a 5G next generation NodeB (gNodeB or gNB), an LTE evolved NodeB (eNodeB or eNB), and/or the like. In some implementations, the base station facilitates a communication session by communicating application-specific data between the UE and the core network. In some implementations, the base station can have a disaggregated or "split" architecture, including one or more distributed units (DUs) and one or more central units (CUs), where the one or more CUs can be further split into a control plane (CU-CP) node and a user plane (CU-UP) node.

In some implementations, each DU can correspond to a logical node that hosts Radio Link Control (RLC), Medium Access Control (MAC), and Physical (PHY) layers of the base station. Operations of the DU can be controlled, at least in part, by the one or more CUs. In general, one DU can support one or multiple cells, although any one cell is typically supported by only one DU. Each CU can correspond to a logical node that hosts Radio Resource Control (RRC) and Packet Data Convergence Protocol (PDCP) functions associated with the base station. Furthermore, in some implementations, one or more CUs can optionally further host Service Data Adaptation Protocol (SDAP) functions associated with the base station. When a CU is split into a CU-CP node and a CU-UP node, the CU-CP node can correspond to a logical node that hosts the RRC and control plane part of the PDCP protocol, while the CU-UP node can correspond to a logical node that hosts the user plane part of the PDCP protocol. Furthermore, in some implementations, the CU-UP can optionally further host the SDAP protocol associated with the base station. In some implementations, there can be multiple CU-UP nodes in the RAN and each CU-UP node can be associated with one or more network slices that are identified via one or more S-NSSAI (e.g., there can be multiple network slices connecting to a given CU-UP node, a different CU-UP node for each network slice, and/or the like). Furthermore, a split of layers and/or protocols among the CU unit and the DU(s) can be flexible and vary from one implementation to another.

In this way, by disaggregating the base station into one or more DUs and one or more CUs, the base station can be implemented with a flexible hardware design that allows scalable cost-effective solutions and coordination of load management, real-time performance optimization, virtualized deployment, and adaptation to various use cases, such as variable transport latency.

In some implementations, when the base station is split into separate DU, CU-CP, and CU-UP nodes, the various nodes associated with the base station can be deployed in various ways. For example, in general, there can be one or multiple DUs, one or multiple CU-CP nodes, and one or multiple CU-UP nodes. Depending on the particular RAN implementation, one DU can be connected to one or more CU-CP nodes via an F1-C interface, one DU can be connected to multiple CU-UP nodes via an F1-U interface under the control of a single CU-CP node, one CU-UP node can be connected to multiple DUs via the F1-U interface under the control of a single CU-CP node, and one CU-UP node can be connected to one or more CU-CP nodes via an E1 interface. Furthermore, in some implementations, the CU-CP node and/or the CU-UP node can be deployed in a centralized manner and/or a distributed manner in various use cases. For example, the CU-CP node and the CU-UP node can both be centralized, with the centralized CU-CP node used to coordinate the operation of several DUs and the centralized CU-UP node used to provide a central termination point for user plane traffic. In another example, the CU-CP node can be deployed in a distributed manner and co-located with a single DU, in which case the co-located CU-CP node can supervise the operation of the single DU. In still another example, the CU-UP node can be distributed and co-located with a single DU. Of course, in a given RAN, different deployment scenarios could be used in combination.

In this way, splitting the CU into separate CU-CP and CU-UP nodes and/or allowing various centralized and/or distributed deployments for the CU, CU-CP node, and CU-UP node can enable flexibility to operate and manage complex networks that support different network topologies, resources, and new service requirements, enable a functional decomposition of radio access between user plane and control plane entities based on a partially decoupled architecture, enable independent scaling and realization for control plane and user plane functions, and enable the location of different RAN functions to be optimized based on the scenario and desired performance. For example, the CU-CP node could be placed in a location close to the DU to provide short latency for critical control plane procedures, the CU-UP node could be centralized in a regional or national data center to favor cloud implementation(s), an additional CU-UP node could also be co-located and/or placed closer to the DU to provide a local termination point for low-latency traffic, etc. Furthermore, the split architecture can support radio resource isolation and improve resource utilization and provide network slice-level isolation for an NSI, which can cover a geographic area of several base stations.

In some implementations, each DU can store information relating to one or more contexts associated with a UE (e.g., a Data Radio Bearer (DRB) ID, S-NSSAI, quality of service (QoS) flow-level parameters, and/or the like associated with each UE context). Each DU can further store certain network-level information, which can include supported bands, supported bandwidth, whether the network has a standalone configuration using only one radio access technology (RAT) or a non-standalone configuration combining multiple RATs, whether certain shared spectrum (e.g., sub-6 GHz) is shared in a dynamic and/or static manner, and/or the like. In some implementations, the CU-CP node can store a list of network slice IDs (e.g., a list of S-NSSAI) and a network slice-to-AMF (e.g., NSSAI-to-AMF) mapping because there can be an AMF for the entire network or an AMF for a single network slice. Additionally, the CU-CP node can store a mapping between network slice IDs and associated CU-UP node and DU combinations (e.g., indicating a DU and CU-UP node configured to handle traffic associated with a given network slice ID).

The core network of example implementation(s) 100 can include various types of telecommunications core networks, such as a 5G next generation core network (NG Core), an LTE evolved packet core (EPC), and/or the like. The AMF of the core network can provide authentication and/or authorization of the UE. In some implementations, an authentication server function (AUSF) component assists the AMF in authenticating and/or authorizing the UE. Additionally, or alternatively, the AMF can coordinate with a unified data management (UDM) component to obtain subscribed NSSAI associated with the UE. The subscribed NSSAI can include a list of S-NSSAI that the UE is subscribed to utilize (e.g., for a communication session). In some implementations, the UE can provide a particular number of S-NSSAI (e.g., eight S-NSSAI or more, fifteen S-NSSAI or more, and/or the like), within the NSSAI, when sending a UE configuration request. Therefore, the UE can provide the NSSAI to the AMF so that the UE can be associated with (e.g., registered to, assigned to, and/or the like) an NSI, which can be considered a virtual network that is implemented through various physical resources of the RAN and/or NFs of the core network. As described herein, the NSSF can provide an NSI for an S-NSSAI included in the NSSAI from the UE. For example, the NSSF can maintain a mapping of S-NSSAI to NSIs. Accordingly, the NSSF can indicate an NSI selection and/or mapping of S-NSSAI to NSIs to the AMF to permit the UE to utilize a corresponding NSI (and/or resources of the NSI) for a communication session.

In some implementations, the NSSF can determine a set of network slice policies to be considered when selecting an NSI. The set of network slice policies can set rules and/or requirements at a network level (e.g., for all or a subset of UEs, for all or specific applications, for all or specific geographic areas, and/or the like) and/or a user level (e.g., per UE, per application, and/or the like). The set of network slice policies, which can be maintained by a policy control function (PCF) component of the core network, can include an area capacity policy (e.g., a data rate capacity over an area), a mobility policy (e.g., location and speeds of UEs), a density policy (e.g., a number of communications sessions over an area), a guaranteed minimum data rate policy (e.g., minimum download and upload speeds), a maximum bitrate policy (e.g., maximum download and upload bitrates), a relative priority policy (e.g., relative importance of the application and/or UE compared to other applications and/or UEs), an absolute priority policy (e.g., objective importance of the application and/or UE compared to other applications and/or UEs), a latency rate policy (e.g., an end-to-end communications transmission time), a reliability policy (e.g., a communications transmission success rate), a resource scaling policy (e.g., an ability or range for scaling resources up or down), and/or the like. In some implementations, the set of network slice policies can define a low latency performance requirement (e.g., an end-to-end communications transmission time less than or equal to a threshold, such as 10 ms), a high latency performance requirement (e.g., an end-to-end communications transmission time greater than a threshold, such as 10 ms), a low reliability performance requirement (e.g., a communications transmission success rate less than a threshold, such as 99.99%), a high reliability performance requirement (e.g., a communications transmission success rate greater than or equal to a threshold, such as 99.99%), a high data rate performance requirement (e.g., download and upload speeds above a threshold, such as 50 Mbps), a low data rate performance requirement (e.g., download and upload speeds less than or equal to a threshold, such as 50 Mbps), a high traffic density requirement (e.g., greater than or equal to a threshold number of user devices per geographical area, such as 10,000 user devices per square kilometer), and/or a low traffic density requirement (e.g., less than a threshold number of user devices per geographical area, such as 10,000 user devices per square kilometer).

The data network of example implementation(s) 100 can include various types of data networks, such as the Internet, a third-party services network, an operator services network, a private network, a wide area network, and/or the like.

As shown in FIG. 1A, and by reference number 105, the UE can send a UE configuration request (e.g., a UE configuration message) to the base station of the RAN to register the UE with the network and/or initiate a communication session between the UE and the data network. As shown in FIG. 1A, the UE configuration request can include an S-NSSAI. The S-NSSAI can be one of a plurality of S-NSSAI in an NSSAI of the UE configuration request. In some implementations, the UE configuration request can identify the data network (e.g., via a data network identifier) that is to be involved in a communication session with the UE. According to some implementations, to send the UE configuration request, the UE can run an application (e.g., a configuration application) that causes the UE to communicate with the AMF of the core network, via the RAN, to request that an S-NSSAI associated with the UE be associated with an NSI to permit the UE to engage in a communication session with the data network.

As shown in FIG. 1A, an S-NSSAI can include information elements that permit the core network (e.g., the NSSF) to select and/or associate the S-NSSAI with an NSI for the UE. Accordingly, the UE can utilize the NSI (as indicated by the NSSF and/or AMF, as described herein) for a communication session associated with the S-NSSAI.

As shown in FIG. 1A, an S-NSSAI of the request can include a slice/service type (SST) field, a network slice type (NEST) field, a service field, an entity/application selection field (a), an entity/application association field, and/or an inter-slice priority level (ISPL) field. In some implementations, the NEST field, the service field, the entity/application selection field, the entity/application association field, and/or the ISPL field are included within a slice differentiator (SD) field of the S-NSSAI. According to some implementations, the S-NSSAI can be configured such that fields of the S-NSSAI are maintained and/or identifiable by the UE, the RAN, the core network, and/or the like. For example, the S-NSSAI can have a length of 32 bits, with 8 bits being allocated for the SST and 24 bits being allocated for the SD, and each information element of the SD can include a certain number of bits and/or be included within the SD in a particular order or at particular locations of the S-NSSAI.

The SST field of the S-NSSAI can identify a service/slice type (e.g., enhanced mobile broadband (eMBB) service, an ultra-reliable, low-latency (URLLC) service, a mobile Internet of Things (mIoT) service, and/or the like) for a communication session involving the UE.

The NEST field of the S-NSSAI can include a NEST identifier that identifies a type of NSI that is capable of supporting one or more applications and/or services involved in a communication session that uses the S-NSSAI to enable the UE to engage in the communication session. For example, the NEST can describe or identify a set of characteristics that the NSI is to have to support a communication session associated with the S-NSSAI. In some implementations, such characteristics can include a range of traffic QoS attributes (e.g., latency greater than a threshold number of milliseconds), resources and/or NFs associated with the communication session, resource scaling policies, a set of corresponding network configurations, and/or the like. In some implementations, the NEST field can include a NEST mapping for a particular SST. In other words, each SST can have a unique mapping of NESTs. In some implementations, the NEST field can be allocated four bits of the SD.

The service field can include a service identifier that identifies one or more services that can be involved in the communication session. For example, such services can include enhanced mobile broadband (e.g., for providing enhanced broadband access in dense areas, ultra-high bandwidth access in dense areas, broadband access in public transport systems, and/or the like), connected vehicles (e.g., for providing vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like), real-time service (e.g., for providing inter-enterprise communications, intra-enterprise communications, maps for navigation, and/or the like), enhanced multi-media (e.g., for providing broadcast services, on demand and live TV, mobile TV, augmented reality (AR), virtual reality (VR), internet protocol (IP) multi-media subsystem (IMS) service, and/or the like), internet of things (IoT) (e.g., for providing metering, lighting management in buildings and cities, environmental monitoring, traffic control, and/or the like), URLLC (e.g., for providing process automation, automated factories, tactile interaction, emergency communications, urgent healthcare, and/or the like), mission critical push-to-talk (PTT), a fixed wireless access category (e.g., for providing localized network access and/or the like), and/or the like. In some implementations, two or more service types can be mapped to a same NEST. For example, IMS and Internet can both be mapped to an eMBB NEST. In some implementations, the service field can be allocated seven bits of the SD.

The entity/application selection (a) field can include a selection identifier that identifies whether the entity/application association field identifies a customer or an application. For example, the selection identifier can be a Boolean logic value (e.g., "0" or "1," "true" or "false," etc.) or another value that differentiates whether the customer/application association field identifies a customer or an application. For example, a selection identifier value of "0" can indicate that the entity/application association field identifies an entity, and a selection identifier value of "1" can indicate that the entity/application association field identifies an application. In some implementations, the entity/application selection field can be allocated one bit of the SD.

The entity/application association field can include an entity/application identifier that identifies an entity or an application that is associated with the service provided in the communication session. For example, the entity can include one or more application service providers capable of communicating with an end user associated with the UE to provide the one or more services to the end user via a communication session associated with the S-NSSAI. In some implementations, the entity can be configured to monitor (e.g., via the communication session) the services at a slice level. Accordingly, different entities can be associated with different policies (e.g., according to service level agreements (SLA) of the entities) that permit monitoring of the services at the slice level. In some implementations, an entity can be associated with and/or allocated an isolated network for services and/or operations of the entity (e.g., according to an SLA of the entity). In this way, entity-specific information can be included in an S-NSSAI to permit one or more policies associated with the entity to be followed for a communication session associated with the S-NSSAI. Accordingly, an entity can be assigned and/or be associated with specific S-NSSAI that can be configured to be associated with specific NSIs, as described herein.

The application can include one or more applications of a UE (e.g., a public safety application, a V2X application, an AR application, a VR application, a video-streaming application, etc.) that utilize a network slice identified by an S-NSSAI. In some implementations, the application can utilize multiple network slices to provide a particular functionality (e.g., a core functionality) of the application (referred to herein as a "multiple-slice application"). In some implementations, a multiple-slice application can be associated with a plurality of communication sessions (e.g., respective communication sessions for the multiple network slices). For example, a V2X application can use a communication session on an eMBB network slice for traffic relating to road situation awareness data and a communication session on a URLLC network slice for traffic relating to safety control data. In some implementations, the entity/application association field can be allocated ten bits of the SD.

The ISPL field can include a priority identifier that identifies a priority level of an NSI that is to be selected for the S-NSSAI to ensure that a priority, among network slices of the network, is given to a communication session associated with the S-NSSAI. As described herein, traffic and services in one NSI should not impact traffic and services of another NSI. However, if resources are limited, the ISPL can indicate which S-NSSAI are to be prioritized over other S-NSSAI. In this way, a communication session, when carried via an NSI and associated with the S-NSSAI, can be given priority over other communication sessions that are using other NSIs according to other S-NSSAI that did not include such a priority (and vice versa). In some implementations, a priority of a group of associated S-NSSAI can be a highest priority (e.g., ISPL value) among the associated S-NSSAI. In some implementations, the ISPL field can be allocated four bits of the SD.

Additionally, or alternatively, an ISPL can be allocated or assigned to S-NSSAI that do not include an SD. For example, an NSSF can use a mapping of ISPLs for various SSTs of the S-NSSAI. In this way, the NSSF can be configured to determine an inter-slice priority for S-NSSAI associated with corresponding SSTs.

In this way, the UE can send a plurality of S-NSSAI (e.g., in a UE configuration request message) that include information elements that permit the RAN to determine whether the plurality of S-NSSAI are configured as a group of associated S-NSSAI.

As shown by reference number 110, the RAN can determine whether a plurality of S-NSSAI received from a UE (e.g., received in the UE configuration request) are configured as a group of associated S-NSSAI. In some implementations, the RAN can determine whether the plurality of S-NSSAI are configured as a group in response to the UE configuration request. Additionally, or alternatively, the RAN can determine whether the plurality of S-NSSAI are configured as a group in response to a traffic flow of the UE. Additionally, or alternatively, the RAN can determine whether the plurality of S-NSSAI are configured as a group after determining that the network has insufficient resources to support one or more communication sessions of the network and/or one or more traffic flows of the network.

In some implementations, the RAN can utilize information elements of the plurality of S-NSSAI to determine whether the plurality of S-NSSAI are configured as a group of associated S-NSSAI. For example, the RAN can determine that the entity/application identifier (i.e., the entity/application identifier of the entity/application association field of the SD) of an S-NSSAI identifies an application based on the selection identifier (i.e., the selection identifier of the entity/application selection (a) field of the SD) of the S-NSSAI (e.g., if the selection identifier has a value of "1" or "true" the RAN can determine that the entity/application identifier identifies an application). Continuing with the previous example, the RAN can compare respective entity/application identifiers (e.g., entity/application identifiers that are determined to identify an application based on the selection identifier) of the plurality of S-NSSAI to determine a match, and determine that the plurality of S-NSSAI are a group of associated S-NSSAI based on determining the match.

In some implementations, the RAN can determine whether the plurality of S-NSSAI are configured as a group of associated S-NSSAI based on a mapping of the S-NSSAI (e.g., a mapping configured in the RAN) to a group of associated S-NSSAI. For example, respective identifiers of the S-NSSAI (e.g., S-NSSAI "11," "23," "50," etc.) can be mapped to a group identifier (e.g., group "1," "15," etc.). In some implementations, an identifier for an S-NSSAI can be a decimal representation, hexadecimal representation, etc. of the S-NSSAI (i.e., a binary representation of the S-NSSAI). In some implementations, the mapping can be stored in a data structure (e.g., a data repository, a database, a table, a list, and/or the like) associated with the RAN (e.g., a CU-CP and/or a DU of the RAN). Additionally, or alternatively, the mapping can be stored in a data structure associated with the core network and provided to the RAN via messaging between the core network and the RAN, as described below.

In some implementations the group of associated S-NSSAI can include two or more S-NSSAI. In some implementations, the group of associated S-NSSAI can be associated with an application of a UE. For example, the group of associated S-NSSAI can provide a particular functionality to an application of a UE. In this way, the RAN can perform session admission and/or preemption, scheduling, resource allocation, etc. so as not to impair the particular functionality of the application (e.g., by disrupting one or more communication sessions of the plurality of S-NSSAI). In some implementations, the particular functionality can be a core functionality of the application (e.g., the application could not perform an intended function of the application without the core functionality). In some implementations, the particular functionality can be defined by an SLA associated with a multiple-slice application.

In some implementations, a CU (e.g., a CU-CP node) and/or a DU of a base station of the RAN can determine whether a plurality S-NSSAI are configured as a group of associated S-NSSAI. For example, the mapping of S-NSSAI to groups of associated S-NSSAI can be configured via a management plane of the RAN to thereby permit a CU and/or a DU of the RAN to determine whether a plurality S-NSSAI are configured as a group of associated S-NSSAI.

Additionally, or alternatively, associations among S-NSSAI can be configured via a control plane of the RAN to permit a CU and/or a DU of the RAN to determine whether a plurality of S-NSSAI are configured as a group of associated S-NSSAI. For example, after creating an initial context for a UE, the AMF of the core network can provide a CU-CP node of the RAN with information relating to the UE (e.g., a UE identifier) and information relating to one or more PDU sessions of the UE (e.g., a PDU session identifier, an S-NSSAI associated with the PDU session, a QoS flow-level parameter associated with the PDU session, etc.) via an N2 interface (e.g., via UE initial context setup request messages and/or PDU session resource setup request messages) to establish UE context at the CU-CP node.

The CU-CP node can provide one or more CU-UP nodes of the RAN with information relating to the UE (e.g., a local UE identifier between the CU-CP node and the one or more CU-UP nodes), information relating to the one or more PDU sessions of the UE (e.g., a PDU session identifier, an S-NSSAI associated with the PDU session, a DRB associated with the PDU session, etc.), and information relating to one or more DRBs associated with the PDU session (e.g., a DRB identifier, a QoS flow-level parameter associated with the DRB, etc.) via the E1 interface (e.g., via bearer context setup request messages) to establish UE context at the one or more CU-UP nodes. In addition, the CU-CP node can provide one or more DUs of the RAN with information relating to the UE (e.g., a local UE identifier between the CU-CP node and the one or more DUs) and information relating to the one or more DRBs configured for the UE (e.g., a DRB identifier, an S-NSSAI associated with the DRB, a QoS flow-level parameter, etc.) via the F1-C interface (e.g., via UE context setup request messages) to establish UE context at the one or more DUs. In this way, a DRB can be associated with an S-NSSAI to permit a CU-CP node and/or one or more DUs to determine associations among S-NSSAI and perform admission, preemption, scheduling, and/or resource allocation accordingly, as described below.

As shown in FIG. 1B, and by reference number 115, the RAN can determine (e.g., based on determining that a plurality of S-NSSAI are configured as a group of associated S-NSSAI) that a preference is to be given to a multiple-slice application relative to one or more applications that do not utilize multiple network slices (referred to herein as a "single-slice application"). In this way, the preference given to the multiple-slice application enables the RAN to avoid disruptions to communication sessions associated with the multiple-slice application.

The RAN can identify a single-slice application based on an S-NSSAI associated with the single-slice application (e.g., an S-NSSAI provided by a UE requesting a connection to the network). For example, the RAN can identify the single-slice application by determining that the S-NSSAI is not associated with a group of associated S-NSSAI (e.g., an entity/application selection field of the S-NSSAI has a value of "0" or "false," an entity/application association field of the S-NSSAI does not match an entity/application association field of another S-NSSAI, and/or the S-NSSAI is not mapped to a group of associated S-NSSAI). In some implementations, a multiple-slice application can be associated with a first UE and a single-slice application can be associated with the first UE or a second UE.

In some implementations, the RAN can determine that a preference is to be given to one or more communication sessions associated with a multiple-slice application relative to a communication session associated with a single-slice application. Additionally, or alternatively, the RAN can determine that a preference is to be given to one or more traffic flows associated with a multiple-slice application relative to a traffic flow associated with a single-slice application. Additionally, or alternatively, the RAN can determine that a preference is to be given to one or more network slices associated with a multiple-slice application relative to a network slice associated with a single-slice application. In some implementations, a CU (e.g., a CU-CP node) and/or a DU of a base station of the RAN can determine that a preference is to be given to a multiple-slice application relative to one or more single-slice applications.

In some implementations, the RAN can determine a preference for a first multiple-slice application relative to a second multiple-slice application. For example, when a resource contention exists between the first multiple-slice application and the second multiple-slice application, the RAN can determine the preference for the first multiple-slice application if a priority associated with the first multiple-slice application is higher than a priority associated with the second multiple-slice application. In some implementations, a priority associated with a multiple-slice application is a highest priority (e.g., ISPL value) among a group of associated S-NSSAI associated with the multiple-slice application. Additionally, or alternatively, a priority associated with a multiple-slice application can be configured by a provider of the network (e.g., mapped to a group of associated S-NSSAI associated with the multiple-slice application).

As shown by reference number 120, the RAN can perform one or more actions (e.g., based on determining that the preference is to be given to a multiple-slice application). In some implementations, the RAN can perform the one or more actions in response to the UE configuration request. Additionally, or alternatively, the RAN can perform the one or more actions in response to a traffic flow of the UE. Additionally, or alternatively, the RAN can perform the one or more actions after determining that the network has insufficient resources to support one or more communication sessions of the network and/or one or more traffic flows of the network.

In some implementations, an action performed by the RAN can relate to admitting (e.g., admitting on a cellular layer of the network) one or more communication sessions associated with a multiple-slice application and/or preempting one or more communication sessions associated with one or more single-slice applications. For example, the RAN can determine that insufficient network resources are available to support one or more communication sessions associated with a multiple-slice application and one or more communication sessions associated with one or more single-slice applications. Continuing with the previous example, based on a preference given to the multiple slice-application, the RAN can admit the one or more communication sessions associated with the multiple-slice application and not admit the one or more communication sessions associated with the one or more single-slice applications (e.g., so as to admit all communication sessions associated with the multiple-slice application).

As another example, the RAN can determine that insufficient network resources are available to support one or more communication sessions associated with a multiple-slice application. Continuing with the previous example, based on a preference given to the multiple-slice application, the RAN can preempt the one or more communication sessions associated with the one or more single-slice applications in order to admit the one or more communication sessions associated with the multiple-slice application (e.g., so as to admit all communication sessions associated with the multiple-slice application). In some implementations, admitting the one or more communication sessions associated with the multiple-slice application can occur during a handover of the one or more communication sessions from a first channel of the network (e.g., associated with a first base station) to a second channel of the network (e.g., associated with a second base station).

In some implementations, an action performed by the RAN can relate to scheduling traffic flows associated with a multiple-slice application (e.g., traffic flows of one or more communication sessions associated with the multiple-slice application). For example, the RAN can identify one or more traffic flows associated with a multiple-slice application and one or more traffic flows associated with one or more single-slice applications. Continuing with the previous example, based on a preference given to the multiple-slice application, the RAN can schedule the one or more traffic flows associated with the multiple-slice application before the one or more traffic flows associated with the one or more single-slice applications.

In some implementations, an action performed by the RAN can relate to allocating resources (e.g., DRBs) to one or more network slices associated with a multiple-slice application and/or reallocating resources from one or more network slices associated with one or more single-slice applications to one or more network slices associated with the multiple-slice application. For example, based on a preference given to a multiple-slice application, the RAN can allocate resources (e.g., available resources) to one or more network slices associated with the multiple-slice application and not allocate the resources to one or more network slices associated with one or more single-slice applications. As another example, the RAN can determine that one or more network slices associated with a multiple-slice application have insufficient resources. Continuing with the previous example, based on a preference given to the multiple-slice application, the RAN can reallocate resources from one or more network slices associated with one or more single-slice applications to the one or more network slices associated with the multiple-slice application.

In this way, the one or more actions enable the RAN to deliver a multiple-slice application to a UE without disruption to one or more communication sessions and/or one or more network slices utilized by the multiple-slice application. Accordingly, impairment to multiple-slice applications (e.g., impairment caused by admission and/or preemption, scheduling, and/or resource allocation performed by the RAN without regard to associated network slices) can be reduced, thus providing for a more efficient use of network resources.

In some implementations, the one or more actions can be performed based on a preference given to a first multiple-slice application relative to a second multiple-slice application, as described above.

In some implementations, a CU (e.g., a CU-CP node) and/or a DU of a base station of the RAN can perform the one or more actions. For example, a CU-CP node of the RAN can perform the one or more actions using an RRC function and/or a PDCP function hosted by the CU-CP node. As another example, one or more DUs of the RAN can perform the one or more actions using an RLC function and/or a MAC scheduler function hosted by the one or more DUs.

As indicated above, FIGS. 1A and 1B are provided as examples. Other examples can differ from what is described with regard to FIGS. 1A and 1B.

Figure 2:
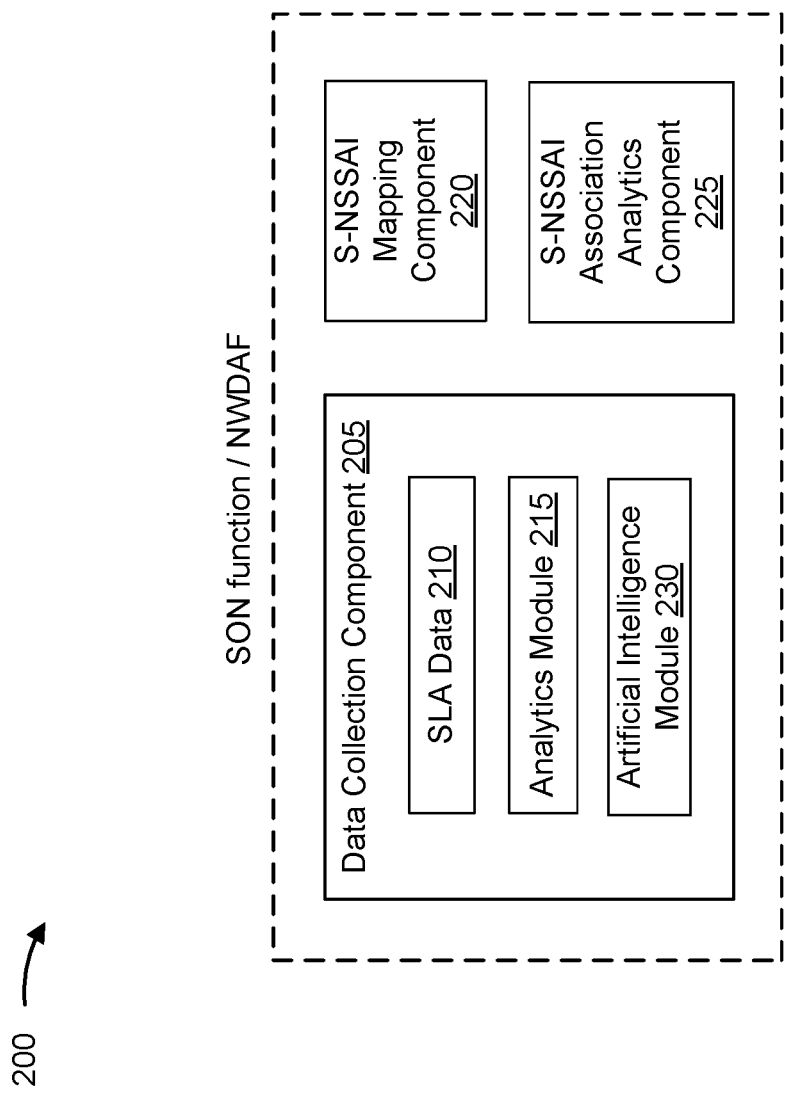
FIG. 2 is a diagram of an example implementation described herein.

FIG. 2 is a diagram of an example implementation 200 described herein. As shown in FIG. 2, example implementation 200 can include a network data analytics function (NWDAF) and/or a self-organizing network (SON) function. The SON function and/or NWDAF can provide lifecycle management, placement, and/or configuration of network resources; can scale up or down network resources; can provide coverage and capacity optimization for the network; can provide mobility robustness for the network; can provide anomaly detection, diagnosis, and/or healing for the network; can provide automatic neighbor relation setup for the network; can provide resource identifier allocation for the network; and/or the like.

In some implementations, the SON function and/or the NWDAF can be associated with a core network of a network, an edge domain of the network, and/or a RAN of the network (e.g., a base station of the RAN). In some implementations, the SON function and the NWDAF can address two different roles in the network. For example, the SON function can handle network level configuration aspects. The NWDAF can handle control plane aspects associated with UEs (e.g., per session resource tuning). The NWDAF can trigger network function placement options through other network functions, such as a NSSF, a PCF, and/or the like.

In some implementations, the SON function and/or the NWDAF can include a data collection component 205. Data collection component 205 can obtain data from one or more components of the network (e.g., in real time, near-real time, periodically, and/or the like). For example, data collection component 205 can obtain core data that can include subscriber data and profiles stored by a UDM of the core network; data utilized by a UDM of the core network for fixed access, mobile access, and/or the like, in the network; data utilized by an AUSF of the core network to provide authentication services and to support authentication of UEs associated with the network; data utilized by an NSSF of the core network to select network slices and to customize each network slice for different services; data utilized by a PCF of the core network to provide a policy framework that incorporates network slicing, roaming, packet processing, mobility management, and/or the like; data utilized by an NEF of the core network to support a service discovery function of the network; data utilized by an AMF of the core network to enable the AMF to act as a termination point for non-access stratum (NAS) signaling, mobility management, etc.; and/or the like.

As another example, data collection component 205 can obtain edge data that can include data utilized by a PCF of the edge domain to provide a policy framework that incorporates network slicing, roaming, packet processing, mobility management, and/or the like; data utilized by an SMF of the edge domain to support the establishment, modification, and release of communications sessions in the network; data utilized by a user plane function (UPF) of the edge domain to enable the UPF to serve as an anchor point for intraRAT and/or interRAT mobility; data utilized by a UPF of the edge domain to apply rules to packets, such as rules pertaining to packet routing, traffic reporting, handling user plane quality of service, etc.; and/or the like.

As a further example, data collection component 205 can obtain RAN data that can include data utilized by a base station of the RAN to provide one or more cells that cover geographic areas; data utilized by a base station of the RAN to perform scheduling and/or resource management for UEs covered by the base station; data indicating subscriber usage patterns in the RAN; data indicating mobility patterns in the RAN at a network slice level and/or a RAN level; data indicating temporal and/or geographic traffic patterns (e.g., at a network slice level and at a RAN level); data indicating user device mix, characteristics, etc.; and/or the like.

In some implementations, data collection component 205 can include SLA data 210. SLA data 210 can include data relating to one or more SLAs between a provider of the network and one or more entities using the network. An SLA can define a level of service to be provided to an entity with regard to uplink transmission speed, downlink transmission speed, uplink bandwidth, downlink bandwidth, network uptime, and/or the like. In some implementations, an SLA can relate to a network slice, a service, an application, and/or the like.

In some implementations, data collection component 205 can include an analytics module 215. Analytics module 215 can provide analytics data (e.g., in real time, near-real time, periodically, and/or the like). In some implementations, the analytics data can include data identifying trends and/or patterns associated with the network; data indicating bit rates through network resources; data indicating collision and packet drop rates associated with the network; data indicating latencies associated with the network; data indicating packets affected by security policies; flow data associated with the network; security data associated with the network; interpreted packet flows from the network; log data from the network; time-series monitoring data associated with the network; synthetic network data; and/or the like.

In some implementations, the SON function and/or the NWDAF can include S-NSSAI mapping component 220. For example, S-NSSAI mapping component 220 can contain S-NSSAI mapping data relating to groups of associated S-NSSAI, as described above.

In some implementations, the SON function and/or the NWDAF can include S-NSSAI association analytics component 225. For example, S-NSSAI association analytics component 225 can provide S-NSSAI analytics data (e.g., in real time, near-real time, periodically, and/or the like). In some implementations, the S-NSSAI analytics data can include data identifying trends and/or patterns associated with groups of associated S-NSSAI; data indicating bit rates through network resources associated with groups of associated S-NSSAI; data indicating latencies associated with groups of associated S-NSSAI; flow data associated with groups of associated S-NSSAI; and/or the like.

In some implementations, data collection component 205 can include an artificial intelligence (AI) module 230. AI module 230 can process (e.g., using a machine learning model) core data, edge data, RAN data, analytics data, SLA data, S-NSSAI mapping data, and/or S-NSSAI analytics data to determine one or more actions to perform with regard to the core network, the edge domain, and/or the RAN. For example, AI module 230 can determine to generate an SLA for an application (e.g., when no SLA for the application exists) that is based on one or more SLAs for one or more network slices associated with the application, one or more services associated with the application, and/or the like. As another example, AI module 230 can determine to tune network slice policies and/or configurations (e.g., network slice policies and/or configurations at the network core and/or the RAN) so as to meet or to exceed an SLA for an application and/or an SLA generated for an application.

As indicated above, FIG. 2 is provided as an example. Other examples can differ from what is described with regard to FIG. 2.

Figure 3:
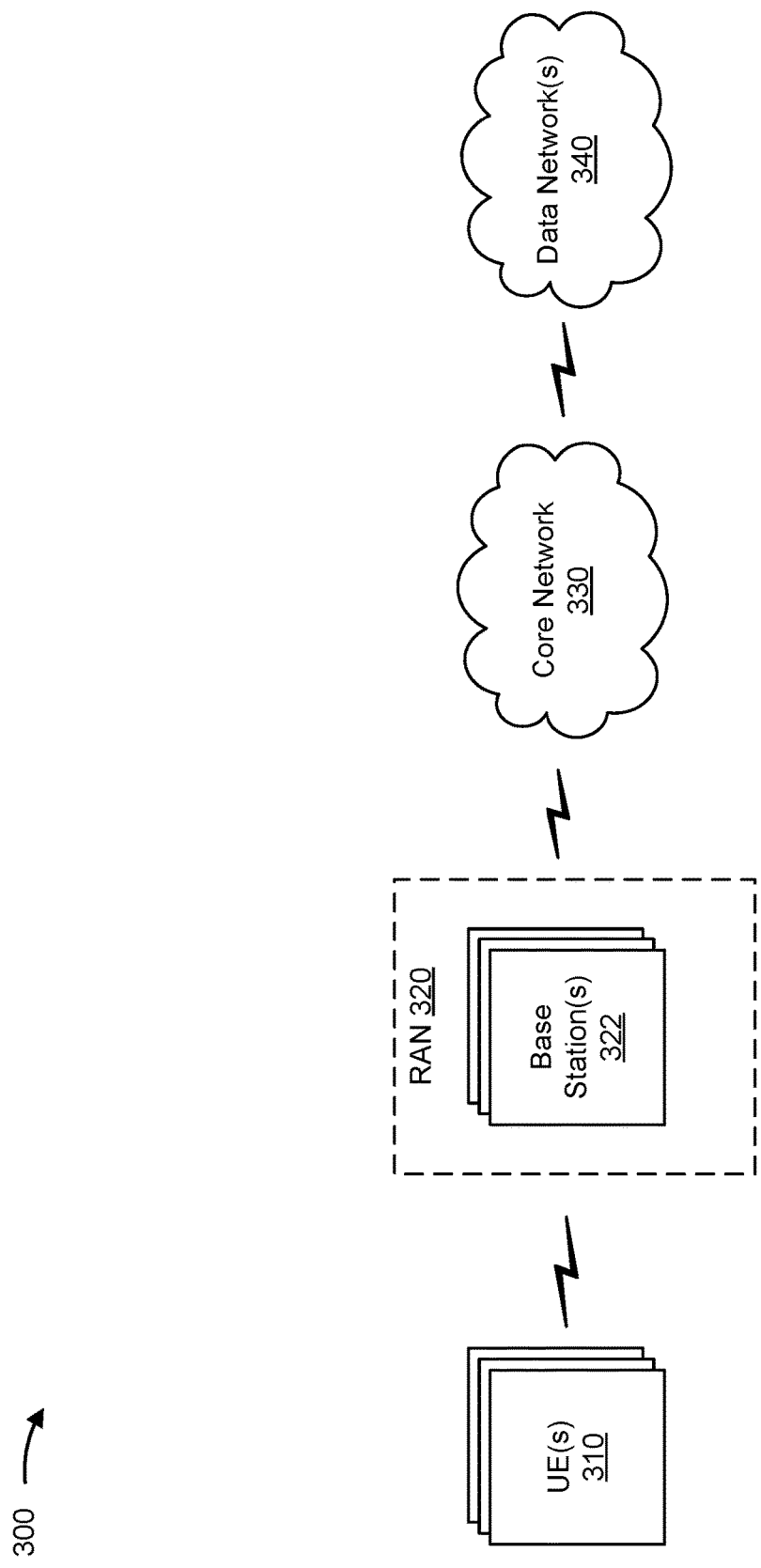
FIG. 3 is a diagram of an example environment in which systems and/or methods described herein can be implemented.

FIG. 3 is a diagram of an example environment 300 in which systems and/or methods, described herein, can be implemented. As shown in FIG. 3, environment 300 can include a UE 310, a RAN 320, a base station 322, a core network 330, and a data network 340. Devices of environment 300 can interconnect via wired connections, wireless connections, or a combination of wired and wireless connections.

UE 310 includes one or more devices capable of communicating with RAN 320 and/or a data network 340 (e.g., via core network 330). For example, UE 310 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 310 can be capable of communicating using uplink (e.g., UE to RAN) communications, downlink (e.g., RAN to UE) communications, and/or sidelink (e.g., UE-to-UE) communications. In some implementations, UE 310 can include a machine-type communication (MTC) UE, such as an evolved or enhanced MTC (eMTC) UE. In some implementations, UE 310 can include an Internet of things (IoT) UE, such as a narrowband IoT (NB-IoT) UE and/or the like.

RAN 320 includes one or more devices capable of communicating with UE 310 using a cellular RAT. For example, RAN 320 can include a base station 322, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 322 has the same characteristics and functionality of RAN 320, and vice versa. RAN 320 can transfer traffic between UE 310 (e.g., using a cellular RAT), one or more other RANs 320 (e.g., using a wireless interface or a backhaul interface, such as a wired backhaul interface), and/or core network 330. RAN 320 can provide one or more cells that cover geographic areas. Some RANs 320 can be mobile base stations. Some RANs 320 can be capable of communicating using multiple RATs.

In some implementations, RAN 320 can perform scheduling and/or resource management for UEs 310 covered by RAN 320 (e.g., UEs 310 covered by a cell provided by RAN 320). In some implementations, RAN 320 can be controlled or coordinated by a network controller, which can perform load balancing, network-level configuration, and/or the like. The network controller can communicate with RAN 320 via a wireless or wireline backhaul. In some implementations, RAN 320 can include a network controller, a SON module or component, or a similar module or component. In other words, RAN 320 can perform network control, scheduling, and/or network management functions (e.g., for other RAN 320 and/or for uplink, downlink, and/or sidelink communications of UEs 310 covered by RAN 320). In some implementations, RAN 320 can apply network slice policies to perform the network control, scheduling, and/or network management functions. In some implementations, RAN 320 can include a central unit and multiple distributed units. The central unit can coordinate access control and communication with regard to the multiple distributed units. The multiple distributed units can provide UEs 310 and/or other RANs 320 with access to data network 340 via core network 330.

Core network 330 includes various types of core network architectures, such as a 5G Next Generation (NG) Core (e.g., core network 400 of FIG. 4), a Long-Term Evolution (LTE) Evolved Packet Core (EPC), and/or the like. In some implementations, core network 330 can be implemented on physical devices, such as a gateway, a mobility management entity, and/or the like. In some implementations, the hardware and/or software implementing core network 330 can be virtualized (e.g., through the use of network function virtualization and/or software-defined networking), thereby allowing for the use of composable infrastructure when implementing core network 330. In this way, networking, storage, and compute resources can be allocated to implement the functions of core network 330 (described with regard to FIG. 4) in a flexible manner as opposed to relying on dedicated hardware and software to implement these functions.

Data network 340 includes one or more wired and/or wireless data networks. For example, data network 340 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
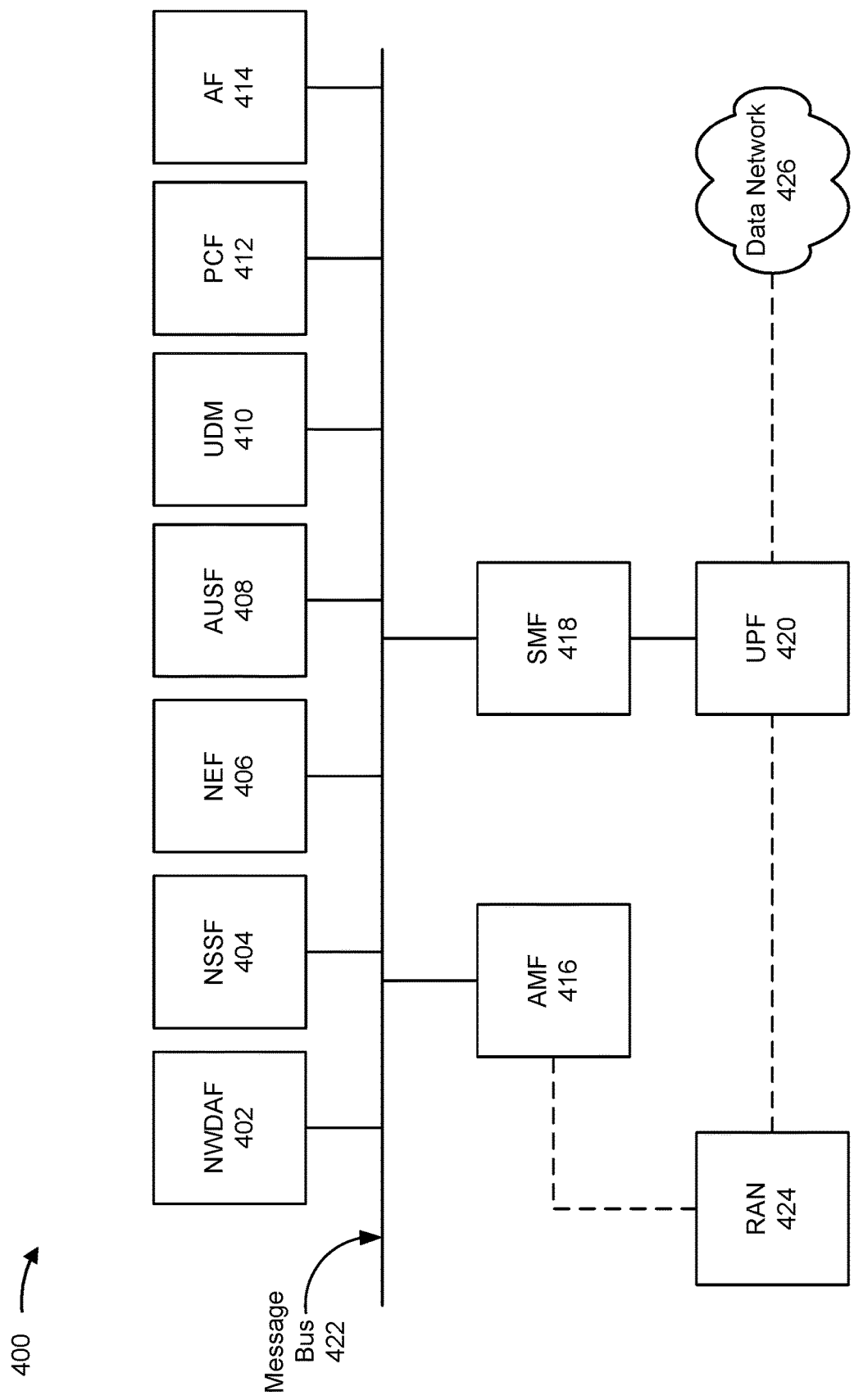
FIG. 4 is a diagram of an example functional architecture of an example core network described herein.

FIG. 4 is a diagram of an example functional architecture of a core network 400 in which systems and/or methods, described herein, can be implemented. For example, FIG. 4 can show an example functional architecture of a 5G core network included in a 5G wireless telecommunications system. In some implementations, the example functional architecture can be implemented by a core network (e.g., core network 330 of FIG. 3) and/or one or more of devices (e.g., a device described with respect to FIG. 5). While the example functional architecture of core network 400 shown in FIG. 4 can be an example of a service-based architecture, in some implementations, core network 400 can be implemented as a reference-point architecture.

As shown in FIG. 4, core network 400 can include a number of functional elements. The functional elements can include, for example, a Network Data Analytics Function (NWDAF) 402, a Network Slice Selection Function (NSSF) 404, a Network Exposure Function (NEF) 406, an Authentication Server Function (AUSF) 408, a Unified Data Management (UDM) component 410, a Policy Control Function (PCF) 412, an Application Function (AF) 414, an Access and Mobility Management Function (AMF) 416, a Session Management Function (SMF) 418, and a User Plane Function (UPF) 420. These functional elements can be communicatively connected via a message bus 422, which can be comprised of one or more physical communication channels and/or one or more virtual communication channels. Each of the functional elements shown in FIG. 4 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 400 can be operatively connected to a RAN 424, a data network 426, and/or the like, via wired and/or wireless connections with UPF 420.

NWDAF 402 can provide network analysis information upon request from network functions. For example, a network function can request, from NWDAF 402, specific analysis information on a load level associated with a network slice. Alternatively, the network function can use a subscribe service to ensure that the network function is notified by NWDAF 402 if the load level of a network slice changes or reaches a specific threshold.

NSSF 404 can select network slice instances for UEs, where NSSF 404 can determine a set of network slice policies to be applied at the RAN 424. By providing network slicing, NSSF 404 allows an operator to deploy multiple substantially independent end-to-end networks potentially with the same infrastructure. In some implementations, each slice can be customized for different services. NEF 406 can support the exposure of capabilities and/or events in the wireless telecommunications system to help other entities in the wireless telecommunications system discover network services and/or utilize network resources efficiently.

AUSF 408 can act as an authentication server and support the process of authenticating UEs in the wireless telecommunications system. UDM 410 can store subscriber data and profiles in the wireless telecommunications system. UDM 410 can be used for fixed access, mobile access, and/or the like, in core network 400. PCF 412 can provide a policy framework that incorporates network slicing, roaming, packet processing, mobility management, and/or the like.

AF 414 can determine whether UEs provide preferences for a set of network slice policies and support application influence on traffic routing, access to NEF 406, policy control, and/or the like. AMF 416 can provide authentication and authorization of UEs. SMF 418 can support the establishment, modification, and release of communications sessions in the wireless telecommunications system. For example, SMF 418 can configure traffic steering policies at UPF 420, enforce UE IP address allocation and policies, and/or the like. AMF 416 and SMF 418 can act as a termination point for Non-Access Stratum (NAS) signaling, mobility management, and/or the like. SMF 418 can act as a termination point for session management related to NAS. RAN 424 can send information (e.g. the information that identifies the UE) to AMF 416 and/or SMF 418 via PCF 412.

UPF 420 can serve as an anchor point for intra/inter RAT mobility. UPF 420 can apply rules to packets, such as rules pertaining to packet routing, traffic reporting, handling user plane Quality of Service (QoS), and/or the like. UPF 420 can determine an attribute of application-specific data that is communicated in a communications session. UPF 420 can receive information (e.g., the information that identifies the communications attribute of the application) from RAN 424 via SMF 418 or an Application Programming Interface (API). Message bus 422 represents a communication structure for communication among the functional elements. In other words, message bus 422 can permit communication between two or more functional elements. Message bus 422 can be a message bus, HTTP/2 proxy server, and/or the like.

RAN 424 can include a base station and be operatively connected, via a wired and/or wireless connection, to the core network 400 through UPF 420. RAN 424 can facilitate communications sessions between UEs and data network 426 by communicating application-specific data between RAN 424 and core network 400. Data network 426 can include various types of data networks, such as the Internet, a third-party services network, an operator services network, a private network, a wide area network, and/or the like.

The number and arrangement of functional elements shown in FIG. 4 are provided as an example. In practice, there can be additional functional elements, fewer functional elements, different functional elements, or differently arranged functional elements than those shown in FIG. 4. Furthermore, two or more functional elements shown in FIG. 4 can be implemented within a single device, or a single functional element shown in FIG. 4 can be implemented as multiple, distributed devices. Additionally, or alternatively, a set of functional elements (e.g., one or more functional elements) of core network 400 can perform one or more functions described as being performed by another set of functional elements of core network 400.

Figure 5:
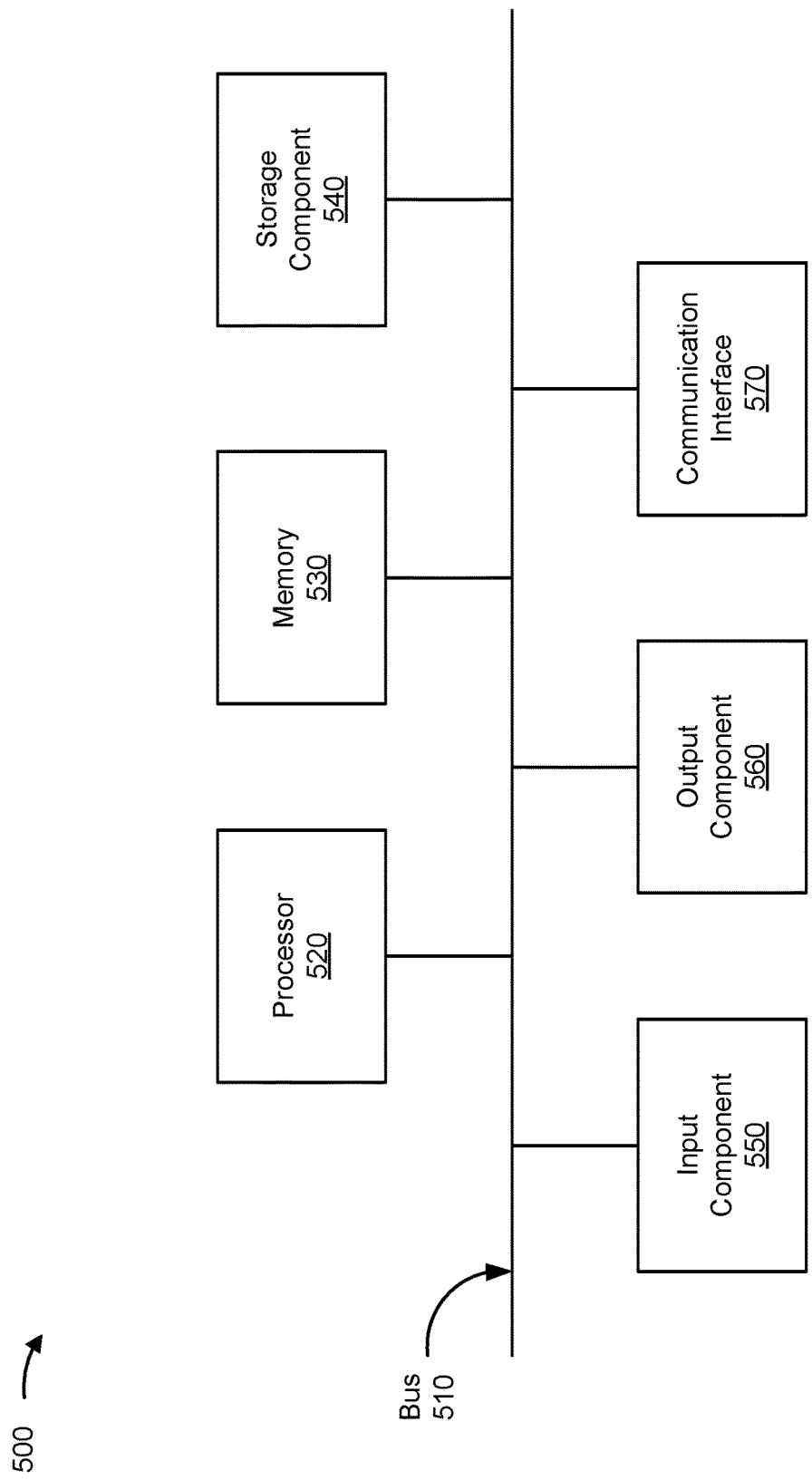
FIG. 5 is a diagram of example components of one or more devices of FIGS. 3 and 4.

FIG. 5 is a diagram of example components of a device 500. Device 500 can correspond to, or can implement, UE 310, a base station (e.g., base station 322) of RAN 320, one or more functional elements or devices of core network 330, one or more functional elements of core network 400, and/or a device of data network 340. In some implementations, UE 310, a base station (e.g., base station 322) of RAN 320, one or more functional elements or devices of core network 330, one or more functional elements of core network 400, and/or a device of data network 340 can include one or more devices 500 and/or one or more components of device 500. As shown in FIG. 5, device 500 can include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 can include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a wireless local area network interface, a cellular network interface, or the like.

Device 500 can perform one or more processes described herein. Device 500 can perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

Figure 6:
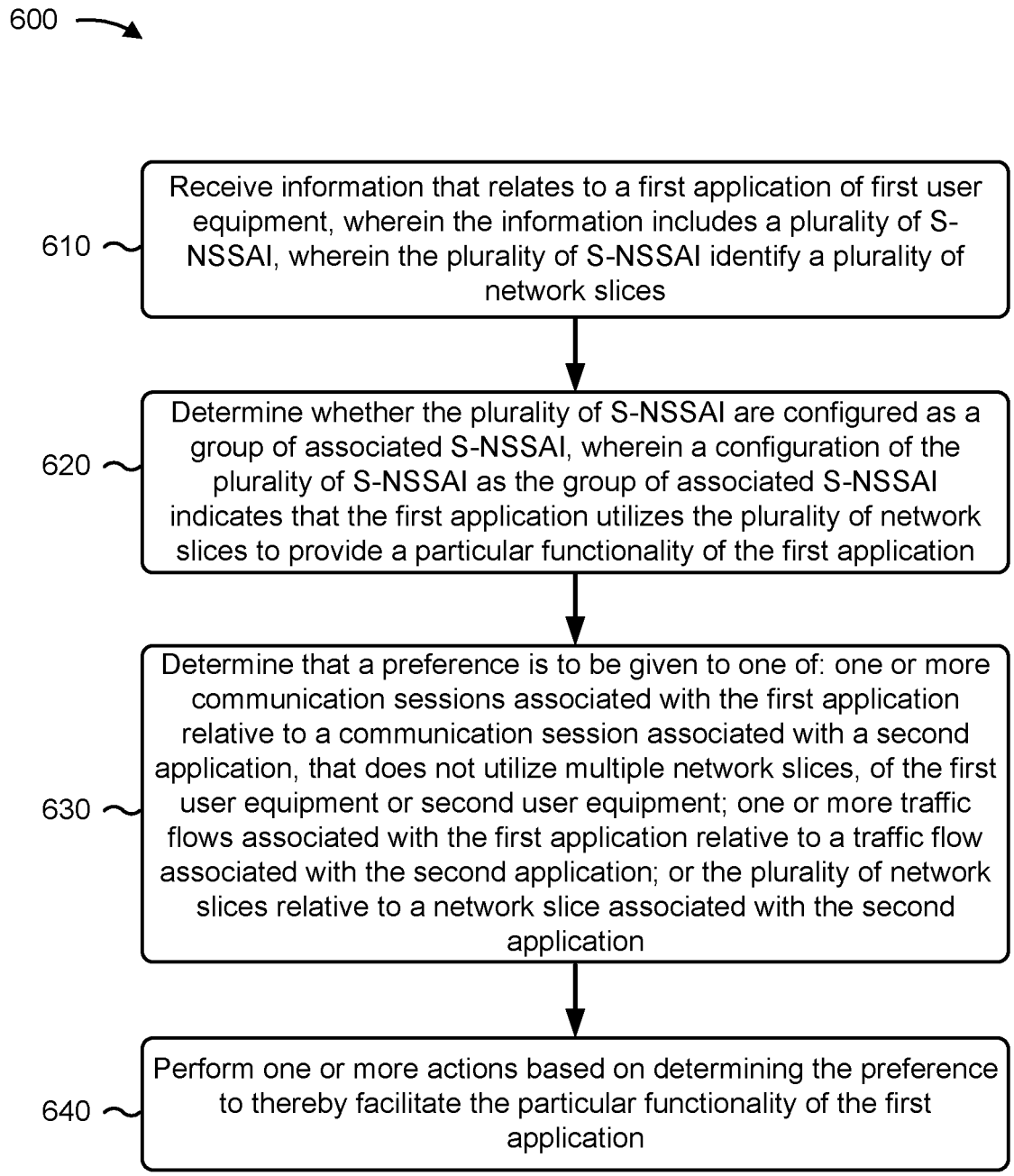
FIG. 6 is a flow chart of an example process for multiple-slice application delivery based on network slice associations.

FIG. 6 is a flow chart of an example process 600 for multiple-slice application delivery based on network slice associations. In some implementations, one or more process blocks of FIG. 6 can be performed by a base station of a RAN (e.g., base station 322 of RAN 320). In some implementations, one or more process blocks of FIG. 6 can be performed by another device or a group of devices separate from or including the base station of the RAN, such as a UE (e.g., UE 310), a core network (e.g., core network 330), and/or the like.

As shown in FIG. 6, process 600 can include receiving information that relates to a first application of first user equipment, wherein the information includes a plurality of S-NSSAI, and wherein the plurality of S-NSSAI identify a plurality of network slices (block 610). For example, the base station of the RAN (e.g., using processor 520, memory 530, storage component 540, input component 550, communication interface 570, and/or the like) can receive information that relates to a first application of first user equipment, as described above. In some implementations, the information includes a plurality of S-NSSAI. In some implementations, the plurality of S-NSSAI identify a plurality of network slices.

As further shown in FIG. 6, process 600 can include determining whether the plurality of S-NSSAI are configured as a group of associated S-NSSAI, wherein a configuration of the plurality of S-NSSAI as the group of associated S-NSSAI indicates that the first application utilizes the plurality of network slices to provide a particular functionality of the first application (block 620). For example, the base station of the RAN (e.g., using processor 520, memory 530, storage component 540, and/or the like) can determine whether the plurality of S-NSSAI are configured as a group of associated S-NSSAI, as described above. In some implementations, a configuration of the plurality of S-NSSAI as the group of associated S-NSSAI indicates that the first application utilizes the plurality of network slices to provide a particular functionality of the first application.

As further shown in FIG. 6, process 600 can include determining that a preference is to be given to one of: one or more communication sessions associated with the first application relative to a communication session associated with a second application, that does not utilize multiple network slices, of the first user equipment or second user equipment; one or more traffic flows associated with the first application relative to a traffic flow associated with the second application; or the plurality of network slices relative to a network slice associated with the second application (block 630). For example, the base station of the RAN (e.g., using processor 520, memory 530, storage component 540, and/or the like) can determine that a preference is to be given to one of: one or more communication sessions associated with the first application relative to a communication session associated with a second application, that does not utilize multiple network slices, of the first user equipment or second user equipment; one or more traffic flows associated with the first application relative to a traffic flow associated with the second application; or the plurality of network slices relative to a network slice associated with the second application, as described above.

As further shown in FIG. 6, process 600 can include performing one or more actions based on determining the preference to thereby facilitate the particular functionality of the first application (block 640). For example, the base station of the RAN (e.g., using processor 520, memory 530, storage component 540, input component 550, output component 560, communication interface 570, and/or the like) can perform one or more actions based on determining the preference to thereby facilitate the particular functionality of the first application, as described above.

Process 600 can include additional implementations, such as any single implementation or any combination of implementations described below and/or in connection with one or more other processes described elsewhere herein.

In some implementations, the one or more actions can include one or more of: admitting the one or more communication sessions associated with the first application and not admitting the communication session associated with the second application; preempting the communication session associated with the second application for the one or more communication sessions associated with the first application; scheduling the one or more traffic flows associated with the first application before the traffic flow associated with the second application; allocating resources to one or more of the plurality of network slices and not allocating the resources to the network slice associated with the second application; or reallocating resources from the network slice associated with the second application to one or more of the plurality of network slices. In some implementations, admitting the one or more communication sessions associated with the first application is to occur during a handover of the one or more communication sessions from a first channel to a second channel of a network associated with the plurality of S-NSSAI.

In some implementations, determining whether the plurality of S-NSSAI are configured as the group of associated S-NSSAI can include determining whether a first slice differentiator (SD) field of a first S-NSSAI of the plurality of S-NSSAI and a second SD field of a second S-NSSAI of the plurality of S-NSSAI contain an identifier of the first application. In some implementations, determining whether the plurality of S-NSSAI are configured as the group of associated S-NSSAI can include determining whether the plurality of S-NSSAI are configured as the group of associated S-NSSAI based on a mapping of the plurality of S-NSSAI to the group of associated S-NSSAI.

In some implementations, the particular functionality of the first application is defined by a service level agreement. In some implementations, the information is received in a request to register the first user equipment with a network associated with the plurality of S-NSSAI, or a request to initiate one or more protocol data unit sessions.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by a device, information that relates to a first application of a first user equipment,
  wherein the information includes a plurality of single-network slice selection assistance information (S-NSSAI),
 determining, by the device and based on the plurality of S-NSSAI being configured as a group of associated S-NSSAI, a preference for the first application, relative to a second application that does not utilize multiple network slices, when the first application is associated with the group of associated S-NSSAI,
  wherein a configuration of the plurality of S-NSSAI as the group of associated S-NSSAI indicates that the first application utilizes a plurality of network slices to provide a particular functionality of the first application; and
 performing, by the device, one or more actions based on determining the preference to thereby facilitate the particular functionality of the first application.

2. The method of claim 1, further comprising:
 determining whether the plurality of S-NSSAI are configured as the group of associated S-NSSAI based on one or more of:
  whether a network associated with the plurality of S-NSSAI has insufficient resources to support one or more communication sessions,
  an entity identifier of the plurality of S-NSSAI, or
  a mapping of the plurality of S-NSSAI to the group of associated S-NSSAI.

3. The method of claim 1, wherein the one or more actions include one or more of:

admitting one or more communication sessions associated with the first application and not admitting a communication session associated with the second application, preempting the communication session associated with the second application for the one or more communication sessions associated with the first application, scheduling one or more traffic flows associated with the first application before traffic flow associated with the second application, allocating resources to one or more of the plurality of network slices and not allocating the resources to a network slice associated with the second application, or reallocating resources from a network slice associated with the second application to one or more of the plurality of network slices.

4. The method of claim 1, further comprising:
determining, by the device, whether the plurality of S-NSSAI are configured as the group of associated S-NSSAI based on an inter-slice priority level (ISPL) field.

5. The method of claim 1, further comprising:
determining whether a first slice differentiator (SD) field of a first S-NSSAI of the plurality of S-NSSAI and a second SD field of a second S-NSSAI of the plurality of S-NSSAI contain an identifier of the first application.

6. The method of claim 1, wherein the particular functionality of the first application is a core functionality.

7. The method of claim 1, further comprising:
determining whether the plurality of S-NSSAI are configured as the group of associated S-NSSAI based on one or more traffic flows of a network associated with the plurality of S-NSSAI.

8. A device, comprising:
one or more memories; and
one or more processors, communicatively coupled to the one or more memories, to:
receive information that relates to a first application of a first user equipment,
wherein the information includes a plurality of single-network slice selection assistance information (S-NSSAI),
wherein the plurality of S-NSSAI identify a plurality of network slices;
determine, based on the plurality of S-NSSAI being configured as a group of associated S-NSSAI, a preference for the first application, relative to a second application that does not utilize multiple network slices, when the first application is associated with the group of associated S-NSSAI,
wherein a configuration of the plurality of S-NSSAI as the group of associated S-NSSAI indicates that the first application utilizes the plurality of network slices to provide a particular functionality of the first application; and
perform one or more actions based on determining the preference to thereby facilitate the particular functionality of the first application.

9. The device of claim 8, wherein the one or more processors, when performing the one or more actions, are to one or more of:
preempt a communication session associated with the second application for one or more communication sessions associated with the first application,
schedule one or more traffic flows associated with the first application before traffic flow associated with the second application,
allocate resources to one or more of the plurality of network slices and not allocate the resources to a network slice associated with the second application, or
reallocate resources from a network slice associated with the second application to one or more of the plurality of network slices.

10. The device of claim 8, wherein the one or more processors, when performing the one or more actions, are to:
admit one or more communication sessions associated with the first application and not admit a communication session associated with the second application,
wherein admitting the one or more communication sessions associated with the first application is to occur during a handover of the one or more communication sessions from a first channel to a second channel of a network associated with the plurality of S-NSSAI.

11. The device of claim 8, wherein the one or more processors are further to:
determine whether the plurality of S-NSSAI are configured as the group of associated S-NSSAI based on a mapping of the plurality of S-NSSAI to the group of associated S-NSSAI.

12. The device of claim 8, wherein the one or more processors are further to:
determine whether the plurality of S-NSSAI are configured as the group of associated S-NSSAI based on one or more traffic flows of a network associated with the plurality of S-NSSAI.

13. The device of claim 8, wherein the one or more processors are further to:
determine whether the plurality of S-NSSAI are configured as the group of associated S-NSSAI based on an inter-slice priority level (ISPL) field.

14. The device of claim 8, wherein the information is received in a request to register the first user equipment with a network associated with the plurality of S-NSSAI.

15. A non-transitory computer-readable medium storing instructions, the instructions comprising:
one or more instructions that, when executed by one or more processors, cause the one or more processors to:
receive information that relates to a first application of a first user equipment,
wherein the information includes a plurality of single-network slice selection assistance information (S-NSSAI),
wherein the plurality of S-NSSAI identify a plurality of network slices;
determine, based on the plurality of S-NSSAI being configured as a group of associated S-NSSAI, a preference for the first application, relative to a second application that does not utilize multiple network slices, when the first application is associated with the group of associated S-NSSAI,
wherein a configuration of the plurality of S-NSSAI as the group of associated S-NSSAI indicates that the first application utilizes the plurality of network slices to provide a particular functionality of the first application; and
perform one or more actions based on determining the preference to thereby facilitate the particular functionality of the first application.

16. The non-transitory computer-readable medium of claim 15, wherein the one or more instructions, that cause the one or more processors to perform the one or more actions, cause the one or more processors to one or more of:

admit one or more communication sessions associated with the first application and not admit a communication session associated with the second application, preempt a communication session associated with the second application for one or more communication sessions associated with the first application, schedule one or more traffic flows associated with the first application before traffic flow associated with the second application, allocate resources to one or more of the plurality of network slices and not allocate the resources to a network slice associated with the second application, or reallocate resources from a network slice associated with the second application to one or more of the plurality of network slices.

17. The non-transitory computer-readable medium of claim 15, wherein the particular functionality of the first application is a core functionality.

18. The non-transitory computer-readable medium of claim 15, wherein the one or more instructions, that further cause the one or more processors to:

determine whether the plurality of S-NSSAI are configured as the group of associated S-NSSAI based on one or more traffic flows of a network associated with the plurality of S-NSSAI.

19. The non-transitory computer-readable medium of claim 15, wherein the one or more instructions, that further cause the one or more processors to:

determine whether the plurality of S-NSSAI are configured as the group of associated S-NSSAI based on a mapping of the plurality of S-NSSAI to the group of associated S-NSSAI, wherein the mapping is configured in a radio access network that is associated with the first user equipment and a second user equipment.

20. The non-transitory computer-readable medium of claim 15, wherein the particular functionality of the first application is defined by a service level agreement.

* * * * *